(12) United States Patent
Kolax et al.

(10) Patent No.: US 8,844,868 B2
(45) Date of Patent: Sep. 30, 2014

(54) SYSTEM AND A METHOD FOR FASTENING AIRCRAFT COMPONENTS IN THE CASE OF A CFK-METAL HYBRID CONSTRUCTION

(75) Inventors: Michael Kolax, Hamburg (DE); Wolf-Dietrich Dolzinski, Ganderkesee (DE)

(73) Assignee: Airbus Operations GmbH, Hamburg (DE)

( * ) Notice: Subject to any disclaimer, the term of this patent is extended or adjusted under 35 U.S.C. 154(b) by 248 days.

(21) Appl. No.: 12/519,556

(22) PCT Filed: Jan. 22, 2008

(86) PCT No.: PCT/EP2008/050692
§ 371 (c)(1),
(2), (4) Date: Jul. 7, 2009

(87) PCT Pub. No.: WO2008/090144
PCT Pub. Date: Jul. 31, 2008

(65) Prior Publication Data
US 2009/0304438 A1    Dec. 10, 2009

Related U.S. Application Data

(60) Provisional application No. 60/897,362, filed on Jan. 23, 2007.

(30) Foreign Application Priority Data

Jan. 23, 2007   (DE) .................. 10 2007 003 276

(51) Int. Cl.
*B64C 1/12*   (2006.01)
*F16B 19/06*   (2006.01)
*B64C 1/06*   (2006.01)

(52) U.S. Cl.
CPC ............... *B64C 1/064* (2013.01); *F16B 19/06* (2013.01); *B64C 1/12* (2013.01)
USPC .................. 244/119; 244/132; 403/408.1

(58) Field of Classification Search
USPC ............ 403/408.1; 411/501, 504, 907, 908; 428/223; 244/119, 131, 132, 133
See application file for complete search history.

(56) References Cited

U.S. PATENT DOCUMENTS 4,221,041 A * 9/1980 Hufnagl et al. ............... 411/501
4,344,995 A * 8/1982 Hammer ....................... 244/131

(Continued)

FOREIGN PATENT DOCUMENTS

DE    19712180    9/1998
EP    0425292    5/1991

(Continued)

OTHER PUBLICATIONS

D. Müller, R. Pfalle, "Praktische Anwendung Hybrider Bauweisen and Fügeverfahren bei Hubschrauberstrukturen", University of Bundeswehr, Institute of Leichtbau, Archiv Seminar 2005, http://www.unibw.de/leichtbau/lehre/seminar/seminare/seminar2005/Seminar05Pfaller.pdf.

(Continued)

Primary Examiner — Michael P Ferguson
(74) Attorney, Agent, or Firm — Greer, Burns & Crain Ltd.

(57) ABSTRACT

The present invention relates to the use of connecting elements for fastening CFK components and metal components in an aircraft or spacecraft, wherein a CFK component and a metal component can be connected to each other via at least one connecting element. The connecting element in this case is produced from an electrically non-conducting material, or has a shank and is produced from an electrically conducting or non-conducting material, wherein the shank is provided with a sleeve consisting of an electrically non-conducting material.

9 Claims, 3 Drawing Sheets

(56) References Cited

U.S. PATENT DOCUMENTS

| | | | |
|---|---|---|---|
| 4,502,092 A * | 2/1985 | Bannink et al. | 244/1 A |
| 4,556,591 A * | 12/1985 | Bannink, Jr. | 244/131 |
| 4,630,168 A * | 12/1986 | Hunt | 244/1 A |
| 4,755,904 A * | 7/1988 | Brick | 244/1 A |
| 4,760,493 A * | 7/1988 | Pearson | 244/1 A |
| 4,912,594 A * | 3/1990 | Bannink et al. | 244/1 A |
| 5,175,665 A * | 12/1992 | Pegg | 411/907 |
| 5,314,282 A * | 5/1994 | Murphy et al. | 244/132 |
| 5,461,534 A | 10/1995 | Gondot | |
| 5,499,782 A * | 3/1996 | Domine | 244/1 A |
| 6,378,805 B1 * | 4/2002 | Stephan et al. | 244/119 |
| 6,582,172 B2 * | 6/2003 | Nickerson et al. | 403/408.1 |
| 7,347,641 B2 * | 3/2008 | Prichard | 403/408.1 |
| 7,740,434 B2 * | 6/2010 | Kamino et al. | 244/1 A |
| 2003/0044256 A1 | 3/2003 | Nickerson et al. | |
| 2004/0246651 A1 * | 12/2004 | De La Fuente De Ana et al. | 361/215 |
| 2006/0284014 A1 * | 12/2006 | Muller et al. | 244/119 |
| 2009/0173828 A1 | 7/2009 | Oguri et al. | |

FOREIGN PATENT DOCUMENTS

| | | |
|---|---|---|
| EP | 0580417 | 1/1994 |
| EP | 0685389 | 12/1995 |
| WO | 2007142354 | 12/2007 |

OTHER PUBLICATIONS

H. Wilmes, B. Kolesnikov, "CFK/Titan, ein Hybridwerkstoff zur Verbesserten Kopplung von Faserverbundwerkstoffen", *Congress Intelligente Leichtbau Systeme*, Nov. 13-14, 2002, pp. 1-8.

Wikipedia, Elektrische Leitfähigkeit, http://de.wikipedia.org/wiki/ElektrischeLeitf%C3%A4higkeit.

Chinese Office Action, Jul. 26, 2013.

Chinese Office Action, Sep. 27, 2011.

Japanese Office Action, Jul. 13, 2012.

* cited by examiner

SYSTEM AND A METHOD FOR FASTENING AIRCRAFT COMPONENTS IN THE CASE OF A CFK-METAL HYBRID CONSTRUCTION

FIELD OF THE INVENTION

The present invention relates to a system and to a method to connect aircraft components to each other in the case of a CFK-metal hybrid construction. Such aircraft components, for example, comprise skin panels, frames and stringers.

BACKGROUND OF THE INVENTION

When connecting metal components to CFK components, as is the case with a CFK-metal hybrid construction, certain protective measures must be taken in order to prevent galvanic corrosion or contact corrosion. Galvanic corrosion can endanger the structural integrity of a construction. Beginning with the reduction of load-bearing cross sections, the metal component can ultimately be completely destroyed. Therefore, galvanic corrosion must be prevented and the effect of the protective measures must be checked, for example by means of regular inspections of the CFK-metal connection.

With galvanic corrosion, different galvanic voltage potentials between a CFK component and a metal component, interacting with an electrolyte, lead to corrosion.

The metal component, which for example consists of aluminium or an aluminium alloy, in this case forms the anode, while the CFK component, or its carbon portion, forms the cathode. Moisture, or condensation water, which for example forms in the bilge of a fuselage, in this case acts as electrolyte. In the bilge, a highly aggressive electrolyte consisting of water, and all liquids which are to be encountered in the human environment, are customarily to be found in abundant quantities. If the connection consisting of metal component and CFK component comes into contact with the electrolyte, then a current flows. In doing so, positive metal atoms of the metal component (cations) migrate to the negative pole of the cathode or of the CFK component. The anode or the metal component slowly decomposes as a result of this cation flow.

By one of the two components, in most cases the CFK component, being electrically insulated to prevent such galvanic corrosion, is known to the applicant. This takes place by means of encapsulating, for example with a GFK material which in the galvanic series is "neutral" compared with metal components and CFK components. By means of encapsulating, the component is reliably separated from its electrolytic environmental surroundings, wherein the cathode and the electrode (anode) are separated from each other so that no current can flow. As a result, the occurrence of galvanic corrosion can be prevented.

Encapsulating of a CFK component or of a metal component with GFK materials, however, has the disadvantage that it is very complicated and cost-intensive, especially if the components have a complex shape. During encapsulating, the corresponding component, inclusive of all its lips, spatial corners, ends and edges, must be encapsulated in an electrically insulating manner. The usefulness of encapsulating an element, therefore, is dependent upon the individual case and must be individually checked. In this case, the additional costs of encapsulating very easily compensate the cost advantage which is actually aimed at with a CFK-metal hybrid construction. That means, the advantages which lie in the material combination of CFK and metal cannot be utilized, or not fully utilized.

To isolate the electron conductor between the electrodes, for example by a glass fibre mat being laid between the CFK component and the metal component in order to electrically separate the parts from each other, is known to the applicant. This method, however, has the disadvantage that it does not suffice if the two components are additionally connected to each other via connecting elements, such as rivets, bolts or screws consisting of a metal material or CFK material.

SUMMARY OF THE INVENTION

The present invention, therefore, has the object of providing a use of connecting elements, wherein the connecting elements on the one hand are inexpensive in production, and on the other hand effectively prevent the occurrence of galvanic corrosion when connecting metal components and CFK components. It is a further object of the invention to provide a corresponding connecting element which can be simply and inexpensively manufactured.

A first aspect of the present invention relates to the use of connecting elements for fastening CFK components and metal components in an aircraft, wherein the connecting elements are formed either from an electrically non-conducting material, such as GFK, AFK or titanium or a suitable titanium alloy, or which have a shank which is provided with a sleeve comprising an electrically non-conducting material. This has the advantage that the costly use of entirely encapsulated connecting elements can be dispensed with.

As a CFK component, in this case a skin panel, for example for an aircraft fuselage, can be provided, which is at least partially produced, or essentially entirely produced, from a CFK material, or its outer layer is formed from at least one CFK material. In this case, frames and/or stringers consisting of metal or a metal alloy can be fastened on the skin panel by means of the connecting elements according to the invention. This has the advantage that an inexpensive CFK-metal hybrid construction can be realized, especially when using CFK skin panels which are connected to stringers or frames consisting of metal. Alternatively, the connecting elements, however, can also be used with conventional metal skin panels which are connected to stringers and/or to frames consisting of a CFK material.

According to one embodiment of the invention, the connecting element for example is a rivet, a bolt, a pin, a screw and/or a clip. These connecting elements in this case can be produced either from a non-conducting material or, if they have a shank, can be provided with an electrically non-conducting sleeve. This has the advantage that CFK components and metal components can be reliably and inexpensively connected to each other, be it via rivets, bolts or clips, etc, so that the occurrence of galvanic corrosion can be reliably prevented.

As electrically non-conducting material for the connecting elements and the sleeves, in this case a GFK material, an AFK material, titanium and/or a titanium alloy, or another suitable non-conducting material, can be used. Depending upon the load which acts upon the connecting element, preferably titanium or a titanium alloy can be used in the case of a large load, while in the case of a rather low load the connecting parts can be produced from a GFK or an AFK material.

According to one embodiment of the connecting element according to the invention, this can be provided with a sleeve consisting of an electrically non-conducting material, wherein the sleeve can be fitted or pushed, or shrunk onto the shank, depending upon how firmly the sleeve is to be connected to the shank.

BRIEF DESCRIPTION OF THE DRAWINGS

The invention is explained in more detail in the following, based on exemplary embodiments with reference to the accompanying figures.

In the figures.

In the figures, the same or functionally similar components refer to the same designations, so long as nothing to the contrary is specified.

DETAILED DESCRIPTION OF THE DRAWINGS

Figure 1:
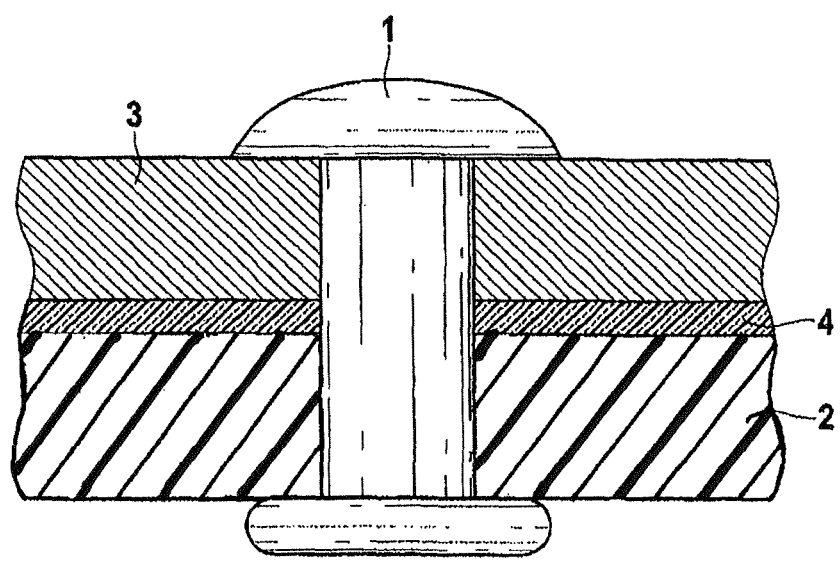
FIG. 1 shows a sectional view of a first exemplary embodiment of the invention, in which a CFK component is connected to a metal component via a rivet as the connecting element.

In FIG. 1, a first embodiment according to the invention is shown, in which the connecting element 1 is produced from a material which in the galvanic series is essentially neutral compared with metal or CFK materials. In this case, the connecting element 1 for example can be produced from titanium or a titanium alloy or from a GFK material. In principle, in addition to these materials, other suitable materials can also be used, which in the galvanic series are neutral compared with metal or GFK materials.

The CFK component 2, which is shown in FIG. 1, for example can be a skin panel of an aircraft fuselage. Metal components 3, for example consisting of aluminium or an aluminium alloy, or steel or a steel alloy, can be fastened on the skin panel in CFK type of construction. Such metal components 3 in this case can be frames and/or stringers. Since the metal component 3, as is shown in FIG. 1, bears upon the skin panel 2 consisting of CFK material, a separating layer 4 can be provided between the two components 2, 3. As a separating layer 4, in this case for example a glass fibre mat or a layer consisting of an AFK material can be used.

Since the metal component 3 is additionally fastened on the CFK skin panel 2 via rivets as connecting elements 1, further protective measures must be provided for preventing galvanic corrosion or contact corrosion. According to the first embodiment according to the invention, the respective connecting element 1, i.e. in this case the rivet, is manufactured from an electrically non-conducting material. This electrically non-conducting material is essentially neutral in the galvanic series compared with metal and CFK materials.

By using a connecting element 1 consisting of an electrically non-conducting material, the occurrence of galvanic corrosion can be effectively prevented, even if an electrolyte, for example consisting of condensation water or suchlike, forms in the region of the connection of the CFK skin panel 2 and the metal component 3.

A further advantage is that the production of the connecting element 1, like the rivet in this case, consisting of an electrically non-conducting material, is significantly simpler and more cost-effective in production than if a rivet consisting of an electrically conducting material were used, which first has to be expensively encapsulated with an electrically non-conducting material.

Figure 2:
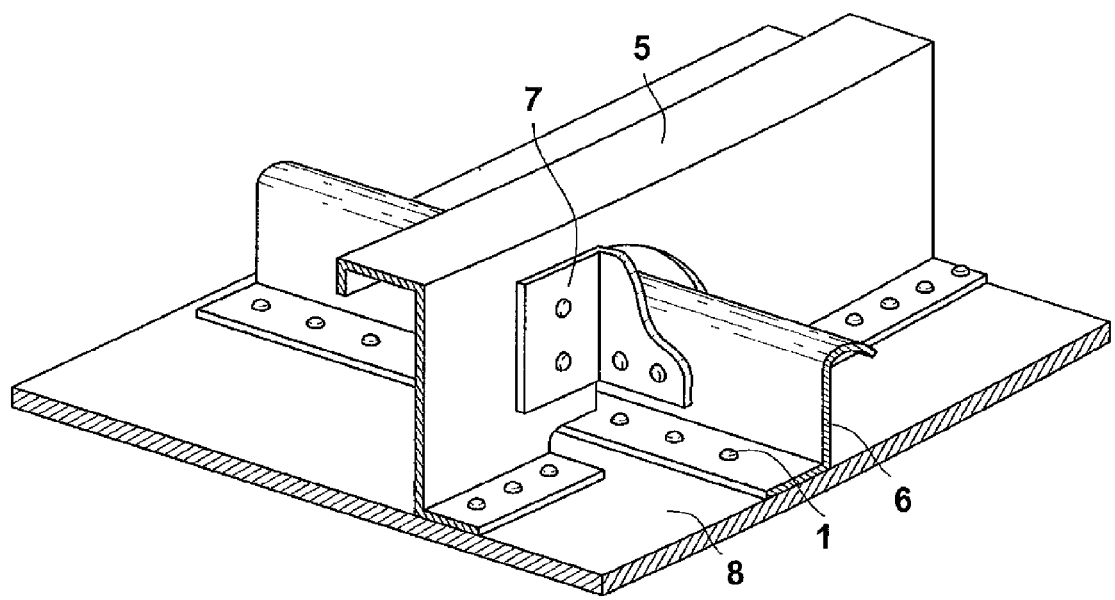
FIG. 2 shows a perspective view of the first exemplary embodiment of the invention, in which a CFK component and a metal component are connected via a clip as the connecting element.

In FIG. 2, a further exemplary embodiment of the first embodiment according to the invention is shown. In this case, stringers and frames, for example for an aircraft fuselage, are fastened on a skin panel 2. The stringers 5 in this case can be produced from a CFK material and the frames 6 can be produced from a metal material. Clips 7 are additionally provided in order to fasten the stringers 5 (CFK component) and the frames 6 (metal component) to one another. In this case, these are produced from an electrically non-conducting material. This has the advantage that the stringers 5 and frames 6 are separated from each other by means of the clip 7 in such a way that corrosion cannot occur. In particular, such a clip 7 can be simply and inexpensively produced for example from GFK, AFK or titanium or a titanium alloy. As a result, considerable costs can be saved compared with known clips which would have to be entirely encapsulated, which in particular is associated with effort and cost if the clips have a complicated structure.

The skin panel 8 in FIG. 2 can also consist of a CFK material or, alternatively, consist of a metal material. In this case, a separating layer or barrier layer (not shown) is provided between the skin panel 8 and the stringers 5 and frames 6. As a separating layer, in this case a glass fibre mat, as is shown in FIG. 1, or a layer of an AFK material, or a tedlar film, can be provided. If the stringers 5 and frames 6 are fastened on the skin panel 8 by rivets 1, then rivets 1 consisting of an electrically non-conducting material can also be used. In this case, it is satisfactory if these rivets 1 are used only with the metal-CFK pairings and with the CFK-CFK pairings or metal-metal pairings.

With a CFK skin panel 8, these rivets 1, therefore, should be used for example for fastening metal stringers 5 or metal frames 6, and vice versa.

Figure 3:
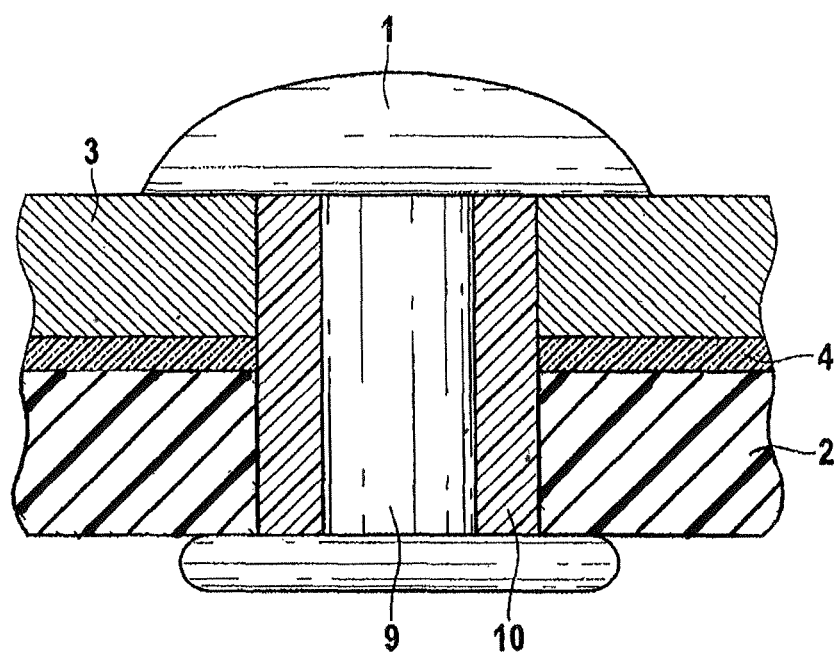
FIG. 3 shows a sectional view of a second embodiment according to the invention, in which a CFK component is connected to a metal component via a rivet as the connecting element, wherein the rivet is provided with a sleeve.

In FIG. 3, a second embodiment of the invention is shown. In this case, the connecting element 1 is not produced from a non-conducting material, as in the first embodiment according to FIG. 1 or 2, but can feature an optional material, i.e. even an electrically conducting material such as CFK or metal or suchlike.

In order to prevent galvanic corrosion, the shank 9 of the connecting element 1, which in this case is a rivet, is provided with a sleeve 10. The sleeve 10 in this case consists of an electrically non-conducting material such as GFK, AFK, titanium or a titanium alloy, or another suitable electrically non-conducting material.

The sleeve 10 in this case is dimensioned so that it extends at least along a section or the shank 9, or over the whole shank, of the connecting element 1. The sleeve 10 in this case for example can be fitted or pushed, shrunk or adhesively fastened onto the shank 9. The provision of a sleeve 10 has the advantage that connecting elements 1 consisting of an electrically conducting material can also be used. These connecting elements 1 can be very simply converted by the provision of a sleeve 1, wherein costly encapsulating can be dispensed with. Furthermore, the sleeve 10 additionally increases the rigidity of the shank 9 of the connecting element 1.

The components which are used in the embodiments, such as skin panels 2, 3, 8, stringers 5 and frames 6, only represent examples of CFK components and metal components in aircraft. It is apparent to the average person skilled in the art that in aircraft construction there are a multiplicity of components which can be manufactured from CFK material or from a metal material and require connecting elements 1 which prevent the occurrence of galvanic corrosion.

In this case, each of these components can be produced from a CFK material or from a metal material or a metal alloy, or can feature these. In particular, instead of a CFK skin panel 8, a metal skin panel 8 can also be used.

Furthermore, the clips 7 and rivets 1, as are used in the exemplary embodiments in FIGS. 1 to 3, also only represent examples of a multiplicity of possible connecting elements 1. The rivets 1 and clips 7 in this case can also have other forms, as shown in FIGS. 1 to 3. The rivets 1 and clips 7 in the figures are only exemplary. In addition to rivets 1 and clips 7, for example bolts, screws and pins, to name only a few examples, can also be used.

The electrically non-conducting material for the connecting element 1, is preferably selected in dependence upon its purpose of application. In this case, connecting elements 1 consisting of titanium or a suitable titanium alloy are preferably used in the case of connections where large forces or high loads occur. On the other hand, if only low loads occur on a connection, then the connecting elements 1 can also be manufactured for example from a GFK material.

Although the present invention was described in the present case based on preferred exemplary embodiments, it is not limited to these, but can be modified in multifarious ways.

The invention claimed is:

1. A method for fastening a skin panel of an aircraft fuselage, clips and stringers, which are carbon fibre reinforced plastic components and frames which are metal components, comprising:
   providing the skin panel, the clip and the stringer, each of which is at least partially produced from a carbon fibre reinforced plastic material, and the frame which is produced from a metal material,
   providing a separating layer between the skin panel and the frame,
   providing a separating layer between the clip and the frame, wherein each separating layer comprises a layer comprising an aramide fibre reinforced plastic material,
   connecting the skin panel and the frame via a connecting section of a connecting element,
   connecting the skin panel and the stringer via a connecting section of a connecting element,
   connecting the stringer and the frame with the clip, wherein the clip is connected to the stringer and the frame, respectively, via the connecting section of a connecting element,
   wherein each connecting element is a rivet,
   wherein each connecting element comprising the connecting section is produced from one of a glass fibre reinforced plastic, aramide fibre reinforced plastic, titanium and a titanium alloy, and wherein the connecting section of the connecting element connecting the skin panel and the frame extends through the skin panel, the frame and the separating layer therebetween and wherein the connecting section of the connecting element connecting the clip and the frame extends through the clip, the frame and the separating layer therebetween.

2. The method according to claim 1, wherein the metal material is a metal or a metal alloy.

3. An aircraft fuselage comprising a skin panel, clips and stringers which are at least partially produced from a carbon fibre reinforced plastic material and frames, which are metal components, wherein a separating layer is provided between the skin panel and the frame and a separating layer is provided between the frame and the clip, wherein each separating layer comprises a layer comprising an aramide fibre reinforced plastic material, or a tedlar film, wherein the skin panel and the frame are connected via a connecting section of a connecting element, wherein the skin panel and the stringer are connected via a connecting section of a connecting element, wherein the frame and the stringer are connected with the clip, wherein the clip is connected to the stringer and the frame, respectively, via the connecting section of a connecting element, wherein each connecting element comprises a rivet, wherein each connecting element comprising the connecting section is produced from a glass fibre reinforced plastic, aramide fibre reinforced plastic, titanium or a titanium alloy, and wherein the connecting section of the connecting element connecting the skin panel and the frame extends through the skin panel, the frame and the separating layer therebetween and wherein the connecting element connecting the clip and the frame extends through the clip, the frame and the separating layer therebetween.

4. A method for fastening, a skin panel of an aircraft fuselage, clips and stingers, which are carbon fibre reinforced plastic components, and frames which are metal components, comprising:
   providing the skin panel, the clip and the stringer, each of which is at least partially produced from a carbon fibre reinforced plastic material, and the frame which is produced from a metal material,
   providing a separating layer between the skin panel and the frame,
   providing a separating layer between the clip and the frame, wherein each separating layer comprises a layer comprising a tedlar film,
   connecting the skin panel and the frame via a connecting section of a connecting element,
   connecting the skin panel and the stringer via a connecting section of a connecting element,
   connecting the stringer and the frame with the clip, wherein the dip is connected to the stringer and the frame, respectively via the connecting section of a connecting element, wherein each connecting element is a rivet, and
   wherein each connecting element comprising the connecting section is produced from one of a glass fibre reinforced plastic, aramide fibre reinforced plastic, titanium and a titanium alloy, and wherein the connecting section of the connecting element connecting the skin panel and the frame extends through the skin panel, the frame and the separating layer therebetween and wherein the connecting section of the connecting element connecting the clip and the frame extends through the clip, the frame and the separating layer therebetween.

5. The method according to claim 4, wherein the metal material is a metal or a metal alloy.

6. An aircraft fuselage comprising as skin panel, clips and frames which are at least partially produced from a carbon fibre reinforced plastic material and stringer, which are metal components, wherein a separating layer is provided between the skin panel and the stringer and a separating layer is provided between the stringer and the clip, wherein each separating layer comprises a layer comprising an aramide fibre reinforced plastic material, or a tedlar film, wherein the skin panel and the stringer are connected via a connecting section of a connecting element, wherein the skin panel and the frame are connected via a connecting section of as connecting element, wherein the frame and the stringer are connected with the clip, wherein the clip is connected to the stringer and the frame, respectively, via the connecting section of a connecting element, wherein each connecting element comprises a rivet and wherein each connecting element comprising the connecting section is produced from a glass fibre reinforced plastic, aramide fibre reinforced plastic, titanium or a titanium alloy, and wherein the connecting section of the connecting element connecting the skin panel and the stringer extends through the skin panel, the stringer and the separating layer therebetween and wherein the connecting element connecting the clip and the stringer extends through the clip, the stringer and the separating layer therebetween.

7. The aircraft fuselage according to claim 6, wherein the metal component is made of metal or a metal alloy.

8. A method for fastening a skin panel of an aircraft fuselage, clips and frames, which are carbon fibre reinforced plastic components, and stringer which are metal components, comprising:

provide the skin panel, the clip and the frames, each of which is at least partially produced from a carbon fibre reinforced plastic material, and the stringer which is produced from a metal material, providing a separating layer between the skin panel and the stringer, providing a separating layer between the clip and the stringer, wherein each separating layer comprises a layer comprising an aramide fibre reinforced plastic material, or to tedlar film, connecting the skin panel and the stringer via a connecting section of a connecting element, connecting the skin panel and the frame via a connecting section of a connecting element, connecting the stringer and the frame with the clip, wherein the clip is connected to the stringer and the frame, respectively, via the connecting section of a connecting element, wherein each connecting element is a rivet, wherein each connecting element comprising the connecting section is produced from one of a glass fibre reinforced plastic, aramide fibre reinforced plastic, titanium and a titanium alloy, and wherein the connecting section of the connecting element connecting the skin panel and the stringer extends through the skin panel, the stringer and the separating layer therebetween and wherein the connecting section of the connecting element connecting the clip and the stringer extends through the clip, the stringer and the separating layer therebetween.

9. The method according to claim 8, wherein the metal material is a metal or a metal alloy.

* * * * *